(12) United States Patent
Bichler

(10) Patent No.: US 9,353,900 B2
(45) Date of Patent: May 31, 2016

(54) LINING ELEMENT FOR THE REHABILITATION OF A PIPELINE

(71) Applicant: Andreas Bichler, Ebbs/Tirol (AT)

(72) Inventor: Andreas Bichler, Ebbs/Tirol (AT)

(73) Assignee: TRELLEBORG PIPE SEALS DUISBURGH GMBH (DE)

( * ) Notice: Subject to any disclaimer, the term of this patent is extended or adjusted under 35 U.S.C. 154(b) by 42 days.

(21) Appl. No.: 14/317,036

(22) Filed: Jun. 27, 2014

(65) Prior Publication Data

US 2015/0345687 A1 Dec. 3, 2015

(30) Foreign Application Priority Data

May 30, 2014 (DE) .......................... 10 2014 107 672

(51) Int. Cl.
*F16L 55/16* (2006.01)
*F16L 55/165* (2006.01)

(52) U.S. Cl.
CPC .................................. *F16L 55/1656* (2013.01)

(58) Field of Classification Search
CPC ............. F16L 55/1651; F16L 55/1652; F16L 55/1653; F16L 55/165; F16L 55/1656
USPC ........... 138/98, 125, 146, 137, 140, 124, 141; 428/35.2, 36.2
See application file for complete search history.

(56) References Cited

U.S. PATENT DOCUMENTS

| | | | | |
|---|---|---|---|---|
| 4,778,553 A | * | 10/1988 | Wood | F16L 55/1651 138/141 |
| 5,010,440 A | * | 4/1991 | Endo | B29C 53/382 138/97 |
| 5,706,861 A | * | 1/1998 | Wood | F16L 55/163 138/97 |
| 5,931,199 A | * | 8/1999 | Kittson | B29C 53/382 138/124 |
| 6,170,531 B1 | | 1/2001 | Jung | |
| 6,682,668 B1 | * | 1/2004 | Driver | B29C 63/36 138/97 |
| 8,580,364 B2 | * | 11/2013 | Quitter | B32B 5/04 138/98 |
| 2005/0092382 A1 | | 5/2005 | Muhlin | |
| 2008/0277012 A1 | * | 11/2008 | Anders | F16L 55/1651 138/98 |
| 2010/0075078 A1 | * | 3/2010 | Quitter | B32B 5/04 428/35.2 |
| 2012/0312407 A1 | | 12/2012 | Muhlin | |

FOREIGN PATENT DOCUMENTS

DE 202010017654 U1 6/2012
WO WO2011036266 A1 3/2011

* cited by examiner

*Primary Examiner* — Patrick F Brinson
(74) *Attorney, Agent, or Firm* — Dickinson Wright PLLC

(57) ABSTRACT

A lining element for the rehabilitation of a pipeline, including a substrate layer made of an expansible resin-absorbing material and a multiple layer system, the multiple layer system being formed from silicone.

13 Claims, 2 Drawing Sheets

LINING ELEMENT FOR THE REHABILITATION OF A PIPELINE

CROSS-REFERENCE TO RELATED APPLICATIONS

The present application is related to, and claims the benefit of priority from, German Patent Application No. 10 2014 107 672.9, filed 30 May 2014, the disclosure of which is incorporated herein by reference in its entirety.

FIELD OF THE INVENTION

The present invention relates to a lining element for the rehabilitation of a pipeline. The lining element can also be used, inter alia, for the rehabilitation of a connecting portion between a main pipeline and a branch pipeline.

Such lining elements are used in the rehabilitation of pipelines, in particular of main pipelines and branch pipelines, in the area of the sewerage system. By inserting such a lining element, leaking and defective sections of pipelines, and in particular of pipeline joint portions, can be rehabilitated. To this end, the lining element is permanently connected to the inner wall of the pipe to be rehabilitated by providing the lining element with an adhesive. A hardenable resin, in particular, is used as an adhesive.

The lining element comprises a substrate layer consisting of a resin-absorbing material, in particular a non-woven or a fiber material. Prior to the insertion of the lining element, the layer consisting of the resin-absorbing material is impregnated with the resin, and then the lining element is brought by means of a rehabilitation device into its final position in the area to be rehabilitated. In particular, the known inversion methods, which can also be referred to as eversion methods, are used in the process. After the resin has hardened, the lining element rests against the inner pipe wall via a substance-to-substance connection.

BACKGROUND

A lining element comprising a layer of resin-absorbing material and a plastic sheet is apparent from WO 2011/104357 A3. A fiber material, a non-woven and/or a spacer fabric are used as the resin-absorbing material. The plastic sheet is manufactured from PVC or thermoplastic polyurethane.

Furthermore, a lining element comprising a layer of resin-absorbing textile material, a coating of a synthetic resin and, optionally, a laminate or coating of foamed material is known from DE 20 2010 017 654 U1. The resin-absorbing layer is formed as a non-woven, fabric and knitted fabric containing ECR glass fibers, optionally mixed with synthetic fibers. The coating formed from a synthetic resin is comprised of polyurethane, polyvinyl chloride, polyacrylate or polyolefin.

In known lining elements, a calibrating tube, which is most frequently inflated with a fluid, preferably vapor, is used for inversion, pressing on and hardening the lining element. In order to obtain a good installation result, it is necessary that the lining element is flexible as regards curves and bends in the pipeline. In addition, the formation of creases is to be avoided or kept to a minimum by this flexibility. Furthermore, it is necessary for the lining element to have sufficient expansibility in the radial direction, i.e. transverse to the longitudinal direction of the lining element, in order to be sufficiently flexible in the case of a change in the nominal width of the pipeline.

However, the known lining elements are disadvantageous in that they have insufficient expansibility in the radial direction. Moreover, it is necessary to exert a large amount of force in order to radially expand the known lining elements.

SUMMARY OF THE DISCLOSURE

Therefore, the invention is based on the object of providing a lining element which has an improved radial expansibility during inversion, pressing on and/or hardening, and wherein a smaller amount of force is required to be exerted for radial expansion.

All of the "lining elements" mentioned in the present invention can also be referred to as liners, rehabilitation elements or pipe liner elements. In principle, such a lining element can have a single-part or multi-part configuration. In addition, the lining element may have a main pipe section and a branch pipe section that is inverted into the branch pipe.

The inventive lining element according to claim 1 serves for the rehabilitation of a pipeline. However, it can also be used for rehabilitating a connecting portion between a main pipeline and a branch pipeline, which is also referred to as a branch-off. The lining element according to the invention comprises a substrate layer of an expansible resin-absorbing material and a multiple layer system, the multiple layer system being formed from silicone. The multiple layer system is, in one embodiment, formed from several individual thin layers, which may also be referred to as plies.

According to the invention, it was recognized that a multiple layer system formed from silicone has a high degree of expansibility in the radial direction. Furthermore, it was recognized that the amount of force for the radial expansion of the lining element is reduced due to the multiple layer system formed from silicone. In addition, the multiple layer system of silicone advantageously ensures that the vapor pressure within the lining element required for inversion and/or pressing it on and/or hardening is maintained because the multiple layer system has a high degree of vapor impermeability. Thus, a calibrating tube can be dispensed with. Furthermore, water can also be used for inversion, pressing on and hardening because the multiple layer system of the lining element according to the invention is configured to be fluid-tight.

Since the multiple layer system is extremely flexible and/or expansible, the lining element is capable of adapting well to the course of the pipeline, particularly to curves, bends and changes in nominal width in the pipeline. In addition to the radial expansibility, the lining element is expansible in a longitudinal direction in order to be able also to follow the curves and bends in the pipeline, if possible without the formation of creases. Within the context of the present invention, the expansibility in the radial direction is understood to be an expansion in the direction of the inner pipe wall.

In particular, the multiple layer system, which is formed from several layers, serves as a vapor barrier and as a resin barrier layer, particularly as an epoxy resin barrier layer. Thus, the multiple barrier layer system ensures a sufficient tightness of the lining element. In addition, the multiple layer system also serves as a protective layer against abrasion and/or damage caused by the substance transported with the waste water or rain water. Furthermore, it serves as a chemical protective layer against chemical reactions of the waste water and/or the transported substances. Moreover, it is capable of preventing the resin from being washed out of the substrate layer.

Per one aspect of the present invention, the multiple layer system has an expansion layer and a barrier layer, which are formed from silicone. For example, the expansion layer can be formed from ELASTOSIL® LR 3003/30 A/B US by the company Wacker Chemie AG or from ELASTOSIL® LR 6250 F by the company Wacker Chemie AG. Furthermore, the barrier layer can be formed, for example, from ELASTOSIL® LR 6250 F by the company Wacker Chemie AG. Per one feature, the barrier layer serves as a vapor barrier and as a resin barrier layer, particularly as an epoxy resin barrier layer, in order to ensure a sufficient tightness of the lining element. Moreover, the expansion layer formed from silicone ensures a high degree of expansibility with, at the same time, a small amount of force being required.

Per one feature, the expansion layer is connected to the substrate layer, and the barrier layer to the expansion layer, so that the barrier layer is attached in such a way that, in the installed state of the lining element, it is positioned inwards, i.e. facing towards the axis of the pipeline. In the state of the lining element in which it is not yet installed, the barrier layer faces outwards. When the lining element is then brought to the region to be rehabilitated by means of an inversion method, i.e. when the lining element is inverted, the barrier layer faces inwards, i.e. in the direction of the axis of the pipeline. Thus, the barrier layer also serves as a protective layer for the multiple layer system and the substrate layer. In particular, the barrier layer in this case offers protection against the resin being washed out of the substrate layer.

Per another feature, the multiple layer system comprises at least one anti-friction layer formed from silicone. The anti-friction layer can be formed, for example, from ELASTOSIL® RD 6620 F by the company Wacker Chemie AG. In this case, the anti-friction layer serves as an installation aid because the lining element enables an easy inverting process during inversion, due to the anti-friction property of the anti-friction layer. Moreover, the anti-friction layer can be provided with an anti-friction film in order to improve the anti-friction properties. Furthermore, the anti-friction layer can be provided with a surface structure that may be configured in a wavy manner with raised portions and/or depressions. Furthermore, the anti-friction properties can be improved by applying an anti-friction liquid, such as oil, on the anti-friction layer, and particularly on the surface structure.

Per a further feature, the anti-friction layer is connected to the barrier layer and in this case faces towards the inside of the pipe in the installed state of the lining element. Thus, the anti-friction layer also serves as a protective layer for the multiple layer system and the substrate layer. In particular, the anti-friction layer in this case offers protection against the resin being washed out of the substrate layer.

According to a further feature, the substrate layer is connected to the multiple layer system with a substance-to-substance connection. In one form, the expansion layer is connected to the substrate layer with a substance-to-substance connection. Furthermore, the multiple layer system can be connected to the substrate layer by means of an adhesive layer.

According to one form of the present invention, the substrate layer and/or the multiple layer system have a radial expansibility of between approx. 150% and approx. 250%, and in one embodiment approx. 200%. This expansibility relates to the expansibility in the radial direction and makes changes of nominal width possible, for example up to a range of about two dimensions, i.e. an up to twofold radial expansion of the nominal width. Thus, the lining element according to the invention can be used in pipe diameters of 30 mm to 400 mm. Furthermore, the lining element according to the invention is suitable for the installation of pipes with the shape of a circle, egg and/or special profile.

Per a further feature of the invention, the expansion layer has a weight of between approx. 150 g and approx. 500 g, and in one embodiment between approx. 200 g and approx. 400 g, wherein the barrier layer has a weight of between approx. 150 g and approx. 450 g, and in one embodiment between approx. 200 g and approx. 400 g, and wherein the anti-friction layer has a weight of between approx. 50 g and approx. 250 g, and in one embodiment between approx. 100 g and approx. 200 g.

Advantageously, the substrate layer and/or the multiple layer system have an expansibility in the longitudinal direction of between approx. 100% and approx. 125%, and in one embodiment between approx. 100% and approx. 115%. This expansibility in the longitudinal direction is advantageous with regard to curves, bends and a change of nominal width. In particular, crease formation can also be reduced or prevented. Per one embodiment, the substrate layer is formed from a fiber material, such as, for instance, a non-woven fabric of ECR glass fibers. In another embodiment, the substrate layer is formed from a non-woven fabric, the non-woven fabric comprising a mixture of ECR glass fibers and synthetic fibers, such as, for example, polyester fibers. The ECR glass fibers are, in one embodiment, fibers with an increased corrosion resistance (ECR: E-Glass Corrosion Resistant). In one embodiment, the ECR glass fibers and the synthetic fibers, such as the polyester fibers, are needled to each other. Moreover, other glass fibers or other fibers may also be used. Alternatively or additionally, the substrate layer can comprise polyester fibers, polypropylene fibers, carbon fibers, basalt fibers and/or aramid fibers. In principle, polyester needle-punched non-wovens, glass fiber mats and thermoplastic plastic fibers, for example PP, PES, carbon fibers or aramid fibers and combinations of the aforementioned constituents can also be used. Due to the fibrous structure, the substrate layer can be impregnated with a resin, in particular an epoxy resin. In one embodiment, the substrate layer is formed as a Multiknit non-woven or Kunit non-woven. A Multiknit or Kunit substrate layer makes possible, in particular, a good radial expansibility and an expansibility in the longitudinal direction, as was already explained above.

The mixing ratio of ECR glass fibers to polyester fibers is in a range of between approx. 90% by wt. ECR glass fibers and approx. 10% by wt. polyester fibers to between 10% by wt. ECR glass fibers and approx. 90% by wt. polyester fibers, and in one embodiment in the range of between approx. 85% by wt. ECR glass fibers and approx. 15% by wt. polyester fibers to between approx. 15% by wt. ECR glass fibers and approx. 85% by wt. polyester fibers.

Per one feature, the substrate layer has a thickness of between approx. 2 mm and approx. 6 mm, and in one embodiment between approx. 3 mm and approx. 5 mm. Further, the substrate layer has a weight per unit area of between approx. 300 g/m$^2$ and approx. 1000 g/m$^2$, and in one embodiment between approx. 400 g/m$^2$ and approx. 900 g/m$^2$.

In one embodiment, the substrate layer can be provided with a foam layer. In this case, the foam layer can be connected to the substrate layer by means of an adhesive layer or by laminating. Per one feature, the foam layer is an open-cell or open-pore foamed material. Per another feature, the at least one foam layer is also actively at least partially impregnated with the resin when the lining element is impregnated. The resin is deposited in the pores of the foamed material structure. When the lining element is then brought to the region to be rehabilitated and is connected to the inner pipe wall as intended, the lining element is pressed against the inner pipe wall. In the process, the pore structure changes. The pores, which previously had an approximately circular shape, become elongated or ellipsoidal by being pressed together, whereby the resin is able to disperse also into adjacent pores that have initially not been completely filled with resin. In this state of the lining element being pressed against the inner pipe wall, further pores are thus filled with resin. The resin then glues the pore structures together and forms a substantially fluid-tight protective layer.

In one embodiment, the lining element is formed from at least three lining parts interconnected by at least three connections in order to form the lining element. It is further preferred that the number of connections is equal to the number of the lining parts. It is further preferred that the respective connection is formed by a seam and/or adhesive connection extending substantially along the adjacent lateral edges of the lining parts. Per one feature, this connection extends continuously from the one end of the lining element to the other end of the lining element. Thus, this may also be referred to as a longitudinal connection or a longitudinal seam.

In this case, each lining part may comprise a main pipe section and a branch pipe section. In the installed position, the main pipe section may in this case rest against the main pipe and the branch pipe section may rest against the branch pipe. The main pipe section may be a brim-shaped portion or a ring, i.e. a section that covers only a short section of the main pipe about the joint portion of the branch pipe. Alternatively, the main pipe section may be a tubular section that covers the main pipe completely in the circumferential direction and over a certain length along the main pipe in the installed state.

In a preferred embodiment, the lining parts are connected to each other by the lateral edges of the adjacent branch pipe sections as well as the lateral edges of adjacent main pipe sections both being continuously connected to each other. A continuous connection can thus be obtained. The lateral edge sections of adjacent branch pipe sections and the lateral edge sections of adjacent main pipe sections can be respectively connected to each other. Particularly if these sections are configured in a straight manner, the lateral edge sections can simply be sewed and/or glued together.

Furthermore, the branch pipe sections can be connected by means of at least one connection to a branch pipe extension that comprises at least one flexible, expansible lining part. The branch pipe can be, for example, a house connection pipe. In the installed state, the branch pipe extension rests against the branch pipe and can have a length of, for example, approx. up to 20 m or more.

In order to manufacture the lining element according to the invention, a liquid layer of silicone, which later forms the barrier layer, is first applied onto a paper ply by means of a doctor blade. On this layer, a second liquid layer of silicone, which later forms the expansion layer, is then applied onto the barrier layer by means of another doctor blade. Then, the substrate layer is applied onto the liquid expansion layer that was the last to be applied, and then this composite is hardened. If an anti-friction layer additionally provided, a layer of silicone forming the liquid anti-friction layer is first applied onto the paper ply by means of a doctor blade, and the barrier layer, the expansion layer and the substrate layer are then applied onto this layer as described above.

A method for the rehabilitation of a pipeline and/or a connecting portion between a main pipeline and a branch pipeline by means of the lining element according to the invention can be carried out as follows. First, the lining element, in particular the substrate layer and/or the foam layer, is impregnated with a resin, in particular an epoxy resin. In the rehabilitation of a mouth region, the lining element has a main pipe section and a branch pipe section. Then, the lining element is inserted into a calibrating tube in the known manner. Subsequently, the lining element is brought by means of a rehabilitation device into the region to be rehabilitated. After positioning the rehabilitation device in the region to be rehabilitated, the inside of the calibrating tube is put under pressure, whereby the lining element is pressed with its substrate layer against the inner wall of the pipeline or inverted into a branch pipe. After pressing it on or inverting it, the pressure within the calibrating tube can be reduced so that the material of the lining element is able to relax. This reduced pressure is referred to as hardening pressure and is between approx 0.25 bars and 0.5 bars, and therefore lies slightly below the inversion pressure. The hardening pressure is maintained over a certain period of time until the resin has hardened and the lining element rests against the inner wall of the pipeline in a positive and frictional engagement.

BRIEF DESCRIPTION OF THE DRAWINGS

The lining element according to the invention is explained in more detail below with reference to the attached drawings. The Figures schematically show.

WRITTEN DESCRIPTION

Figure 1:
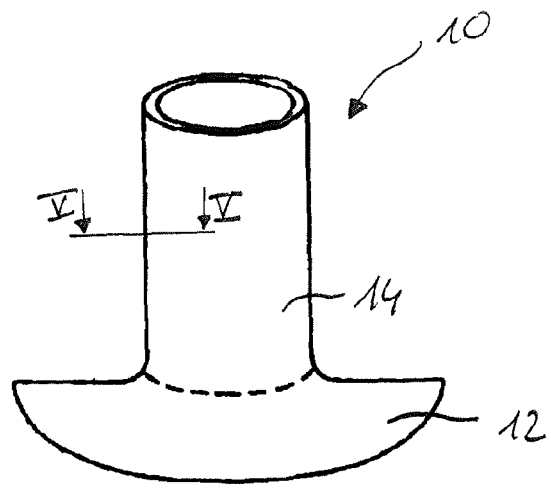
FIG. 1 a perspective view of a first lining element according to the invention in the installed state in a pipeline that is not shown.

FIG. 1 shows a first lining element 10 according to the invention, which is configured to be hat-shaped. The lining element 10 serves for rehabilitating a pipeline which is not shown, in particular a mouth region between a main pipeline and a branch pipeline in a sewerage system.

The lining element 10 has a hat-brim-shaped main pipe section 12 and a branch pipe section 14 that are connected to each other. In this case, the main pipe section 12 extends in the longitudinal direction of the main pipeline and the branch pipe section 14 in the longitudinal direction of the branch pipeline.

Figure 2:
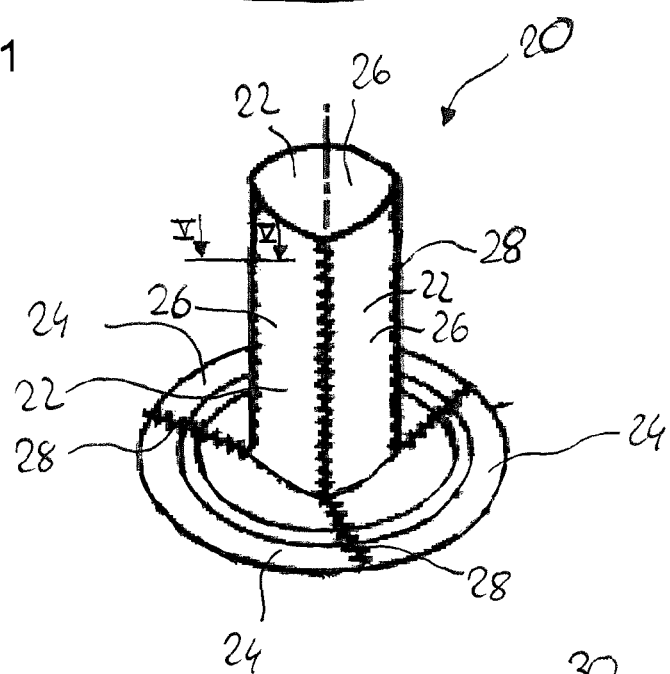
FIG. 2 a perspective illustration of a second lining element according to the invention in the installed state in a pipeline that is not shown.

FIG. 2 illustrates a second embodiment of a lining element 20 according to the invention, which differs from the first embodiment in that the lining element 20 is formed from three lining parts 22. Each of the lining parts 22 has a main pipe section 24 and a branch pipe section 26 that are integrally connected to each other. In order to manufacture the lining element 20, three lining parts 22 are connected to each other by means of three connections 28. Each connection 28 is produced by sewing and/or gluing. However, other alternatives for connecting the lining parts 22 are also possible. With regard to the production of the lining parts 22 and the exact realization of the connection of the lining parts 22, reference is made to WO 2011/104357 A3, whose content of disclosure is thus incorporated into the present application. Furthermore, WO 2011/104357 A3 discloses other embodiments of a lining element formed from several lining parts, which are thus also incorporated into the application.

Figure 3:
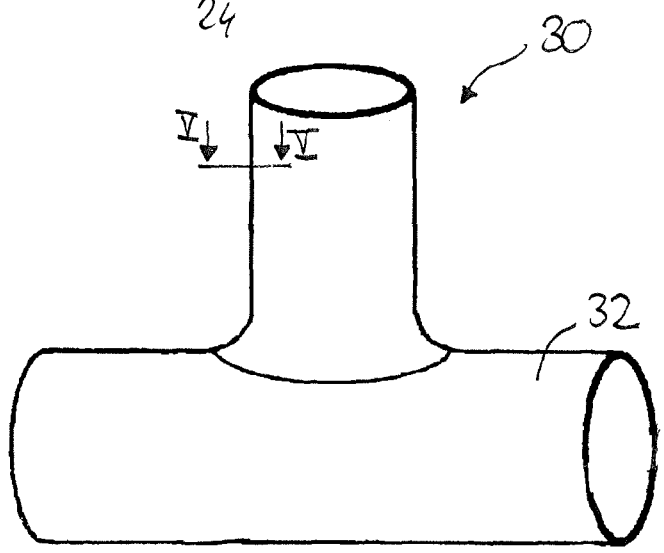
FIG. 3 a perspective illustration of a third lining element according to the invention in the installed state in a pipeline that is not shown.

FIG. 3 illustrates a third embodiment of a lining element 30 according to the invention, which differs from the first two embodiments in that the lining element 30 is formed approximately T-shaped and that the main pipe section 32 is configured to be tubular. Furthermore, other embodiments of a lining element 30 configured in this manner, which is formed from several lining parts, are apparent from WO 2011/104357 A3, which are thus also part of the disclosure of the present application.

Figure 4:
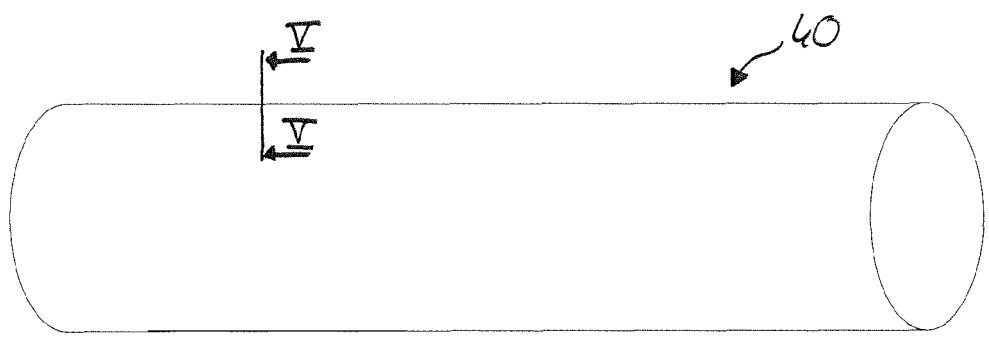
FIG. 4 a perspective illustration of a fourth lining element according to the invention in the installed state in a pipeline that is not shown.

FIG. 4 illustrates a fourth embodiment of a lining element 40 according to the invention, which differs from the preceding embodiments in that the lining element 40 is configured to be hose-shaped or tubular. Such a lining element 40 may be used for rehabilitating a main pipeline.

Figure 5:
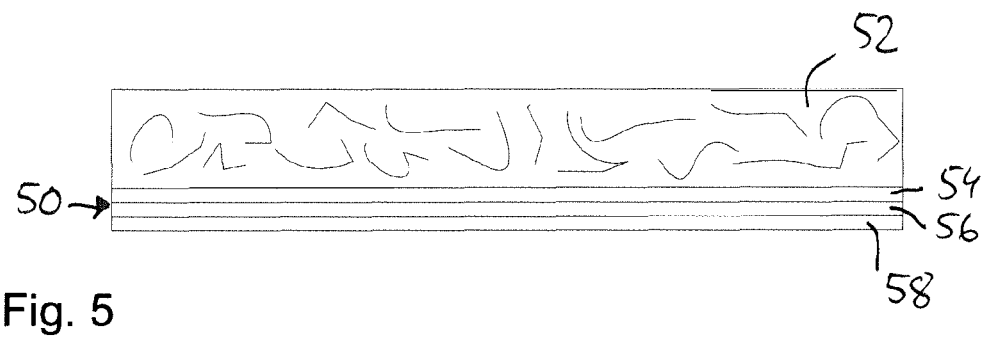
FIG. 5 an enlarged section of a cross section along the line V-V in FIGS. 1 to 4.

The lining elements according to the invention 10, 20, 30, 40 have a multiple layer system 50 and a substrate layer 52, as is shown in FIG. 5. The substrate layer 52 is formed from an expansible, resin-absorbing fiber material. In particular, the substrate layer 52 is formed as a fiber material and comprises a plurality of interwoven polyester fibers and/or glass fibers. In this case, the substrate layer 52 can be formed as a Kunit non-woven or as a Multiknit non-woven. The substrate layer 52 can be impregnated with a hardenable resin and, in the hardened state, rests against the pipe wall to be rehabilitated. Prior to the insertion of the lining element 10, 20, 30, 40 into the pipeline, the substrate layer 52 is impregnated with a resin.

The multiple layer system 50 is formed from several interconnected layers or plies. The multiple layer system has an expansion layer 54 of silicone, a barrier layer 56 of silicone, and optionally an anti-friction layer 58 of silicone. For example, the expansion layer can be formed from ELASTOSIL® LR 3003/30 A/B US by the company Wacker Chemie AG or from ELASTOSIL® LR 6250 F by the company Wacker Chemie AG. Furthermore, the barrier layer can be formed, for example, from ELASTOSIL® LR 6250 F by the company Wacker Chemie AG. The anti-friction layer can be formed, for example, from ELASTOSIL® RD 6620 F by the company Wacker Chemie AG. The expansion layer 54 faces the substrate layer 52 and has a great expanding capacity or high expansibility in the radial direction, i.e. in the direction of the inner pipe wall. The barrier layer 56 adjoins the expansion layer 54 and serves, in particular, as a vapor and/or resin barrier layer, so that, on the one hand, the fluid required inside the lining element 10 for inversion and hardening cannot escape, and on the other hand, the resin is not gradually washed out of the substrate layer after rehabilitation.

The anti-friction layer 58 is connected to the barrier layer 56 and, in the installed state of the lining elements 10, 20, 30, 40, faces towards the inside of the pipe. When the lining elements 10, 20, 30, 40 are not yet installed, the anti-friction layer 58 is located on the outside. When the lining elements 10, 20, 30, 40 are then brought to the region to be rehabilitated by means of an inversion method, the lining elements 10, 20, 30, 40 are inverted so that then, the anti-friction layer 58 lies on the inside, i.e. faces towards the inside of the pipeline.

In the installed state, the anti-friction layer 58 also serves as a protective layer against abrasion and/or damage caused by the substance transported with the waste water or rain water. Furthermore, it serves as a chemical protective layer against chemical reactions of the waste water and/or the transported substances. Moreover, it is capable of preventing the resin from being washed out of the substrate layer 14.

Moreover, the anti-friction layer 58 may have a special wavy surface structure with raised portions and depressions. In addition, the anti-friction layer 58 serves as an installation aid for the lining elements 10, 20, 30, 40. In addition, an anti-friction liquid can be applied onto the anti-friction layer 58, so that an easier inverting process of the lining elements 10, 20, 30, 40 during the inversion is made possible.

The lining elements 10, 20, 30, 40 according to the illustrated embodiments have the following technical data, wherein not all of the values specified below have to be realized at the same time; rather only some of these values may be realized. For example, the substrate layer and/or the multiple layer system have a radial expansibility of between approx. 150% and approx. 250%. Furthermore, the expansion layer 54 has a weight of between approx. 200 g and approx. 400 g, the barrier layer 56 has a weight of between approx. 200 g and approx. 400 g, and the anti-friction layer 58 has a weight of between approx. 100 g and approx. 200 g. The substrate layer 52 and/or the multiple layer system 50 have an expansibility in the longitudinal direction of between approx. 100% and approx. 125%. The mixing ratio of ECR glass fibers to polyester fibers in the substrate layer 52 may be between approx. 90% by wt. ECR glass fibers and approx. 10% by wt. polyester fibers to between approx. 10% by wt. ECR glass fibers and approx. 90% by wt. polyester fibers. Furthermore, the substrate layer may have a thickness of between approx. 2 mm and approx. 6 mm, with a weight per unit area of approx. between 300 g/m$^2$ and approx. 1000 g/m$^2$.

The lining elements 10, 20, 30, 40 according to the invention are characterized by the multiple layer system 50 formed from silicone. The silicone-based multiple layer system 50 ensures an improved expansibility in the radial direction, i.e. in the direction of the inner pipe wall. Moreover, due to the multiple layer system 50 of silicone, a smaller amount of force is required for expansion in the radial direction.

REFERENCE SIGN LIST

10 Lining element
12 Main pipe section
14 Branch pipe section
20 Lining element
22 Lining part
24 Main pipe section
26 Branch pipe section
28 Connections
30 Lining element
32 Main pipe section
40 Lining element
50 Multiple layer system
52 Substrate layer
54 Expansion layer
56 Barrier layer
58 Anti-friction layer

The invention claimed is:

1. A lining element for the rehabilitation of a pipeline, comprising a substrate layer made of an expansible resin-absorbing material and a multiple layer system, the multiple layer system being formed from several individual thin layers of silicone.

2. The lining element according to claim 1, wherein the multiple layer system has an expansion layer and a barrier layer, which are formed from silicone.

3. The lining element according to claim 1, wherein multiple layer system has at least one anti-friction layer formed from silicone.

4. The lining element according to claim 1, wherein the substrate layer is connected to the multiple layer system with a substance-to-substance connection.

5. The lining element according to claim 1, wherein the substrate layer and/or the multiple layer system have a radial expansibility of between approximately 150% and approximately 250%.

6. The lining element according to claim 1, wherein the expansion layer has a weight of between approximately 150 g and approximately 500 g, wherein the barrier layer has a weight of between approximately 150 g and approximately 450 g, and wherein the anti-friction layer has a weight of between approximately 50 g and approximately 250 g.

7. The lining element according to claim 1, wherein the substrate layer and/or the multiple layer system have an expansibility in the longitudinal direction of between approximately 100% and approximately 125%.

8. The lining element according to claim 1, wherein the substrate layer is formed from a fiber material.

9. The lining element according to claim 8, wherein the substrate layer is formed from a non-woven fabric of ECR glass fibers.

10. The lining element according to claim 8, wherein the substrate layer is formed from a non-woven fabric, the non-woven fabric comprising a mixture of ECR glass fibers and synthetic fibers.

11. The lining element according to claim 10, wherein a mixing ratio of ECR glass fibers to polyester fibers is in the range of between approximately 90% by wt. ECR glass fibers and approximately 10% by wt. polyester fibers to between approximately 10% by wt. ECR glass fibers and approximately 90% by wt. polyester fibers.

12. The lining element according to claim 1, wherein the substrate layer has a thickness of between approximately 2 mm and approximately 6 mm, wherein the substrate layer has a weight per unit area of between approximately 300 g/m² and approximately 1000 g/m².

13. The lining element according to claim 1, wherein at least three lining parts are interconnected by at least three connections in order to form the lining element.

* * * * *